United States Patent [19]

Dinh

[11] Patent Number: 4,636,104

[45] Date of Patent: Jan. 13, 1987

[54] STRUCTURAL FIXING DEVICES FOR FURNITURE

[75] Inventor: Didier Dinh, Le Vesinet, France

[73] Assignee: NIVO S.A., Saint Germain en Laye, France

[21] Appl. No.: 716,355

[22] Filed: Mar. 26, 1985

[51] Int. Cl.[4] .............................................. F16B 7/08
[52] U.S. Cl. .................................. 403/191; 403/234; 248/231
[58] Field of Search ............... 403/234, 237, 191, 209; 248/231

[56] References Cited

U.S. PATENT DOCUMENTS

| | | | |
|---|---|---|---|
| 1,245,917 | 11/1917 | Hewitt | 403/235 |
| 2,107,037 | 2/1938 | Kippenberg et al. | 248/231 |
| 2,623,935 | 12/1952 | Young | 403/191 X |
| 2,699,203 | 1/1955 | White | 248/231 X |
| 3,244,392 | 4/1966 | Sheets | 248/231 |
| 3,522,960 | 8/1970 | Moore | 403/234 |

FOREIGN PATENT DOCUMENTS

| | | | |
|---|---|---|---|
| 819147 | 10/1951 | Fed. Rep. of Germany | 256/65 |
| 1016817 | 11/1952 | France | |
| 1029246 | 5/1966 | United Kingdom | |
| 1235356 | 6/1971 | United Kingdom | 248/231 |

Primary Examiner—Andrew V. Kundrat
Attorney, Agent, or Firm—Amster, Rothstein & Ebenstein

[57] ABSTRACT

Hollow structural sections of a circular or polygonal cross section are fixed to assembly elements having a circular or polygonal cross section by means of an end piece fitted into the end of a structural section, a holding cable surrounding an assembly element and a device for tensioning the cable which may be a winding shaft to which one end of the cable is fixed and which may move in a cavity of the end piece between a cable winding position and a position in which the shaft is locked in the cavity. In another embodiment, it is the head of the end piece which is movable with respect to the body of the end piece and which tensions a cable loop of fixed length.

9 Claims, 11 Drawing Figures

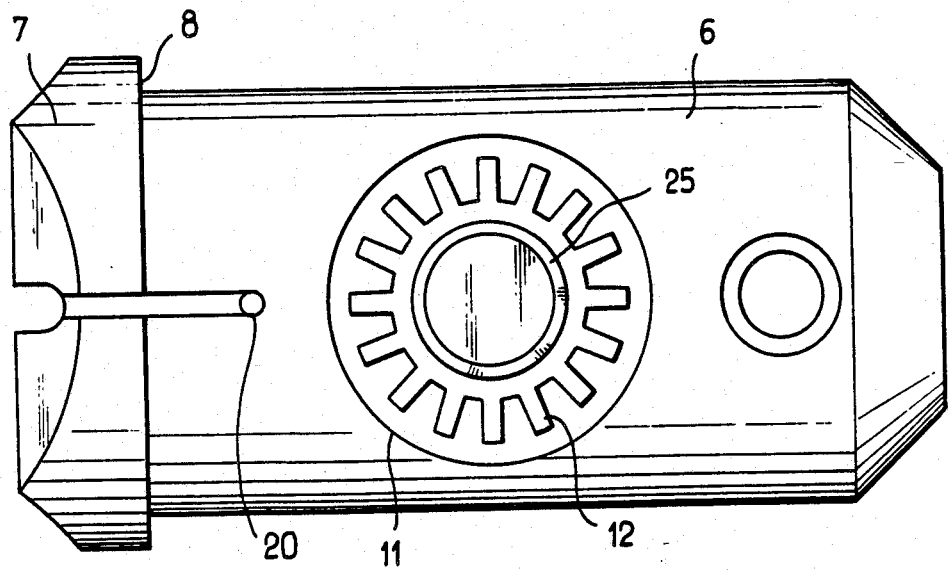
FIG_4a
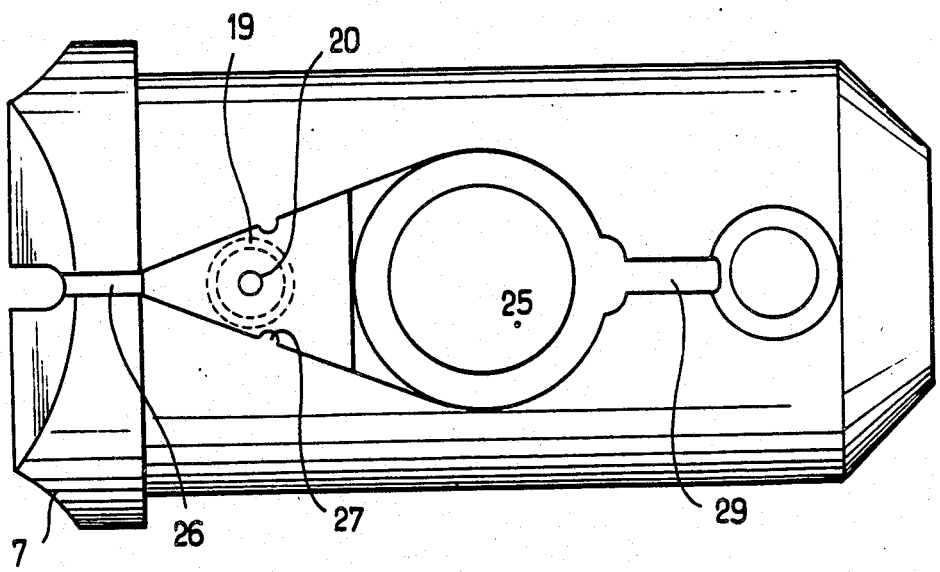
FIG_4b

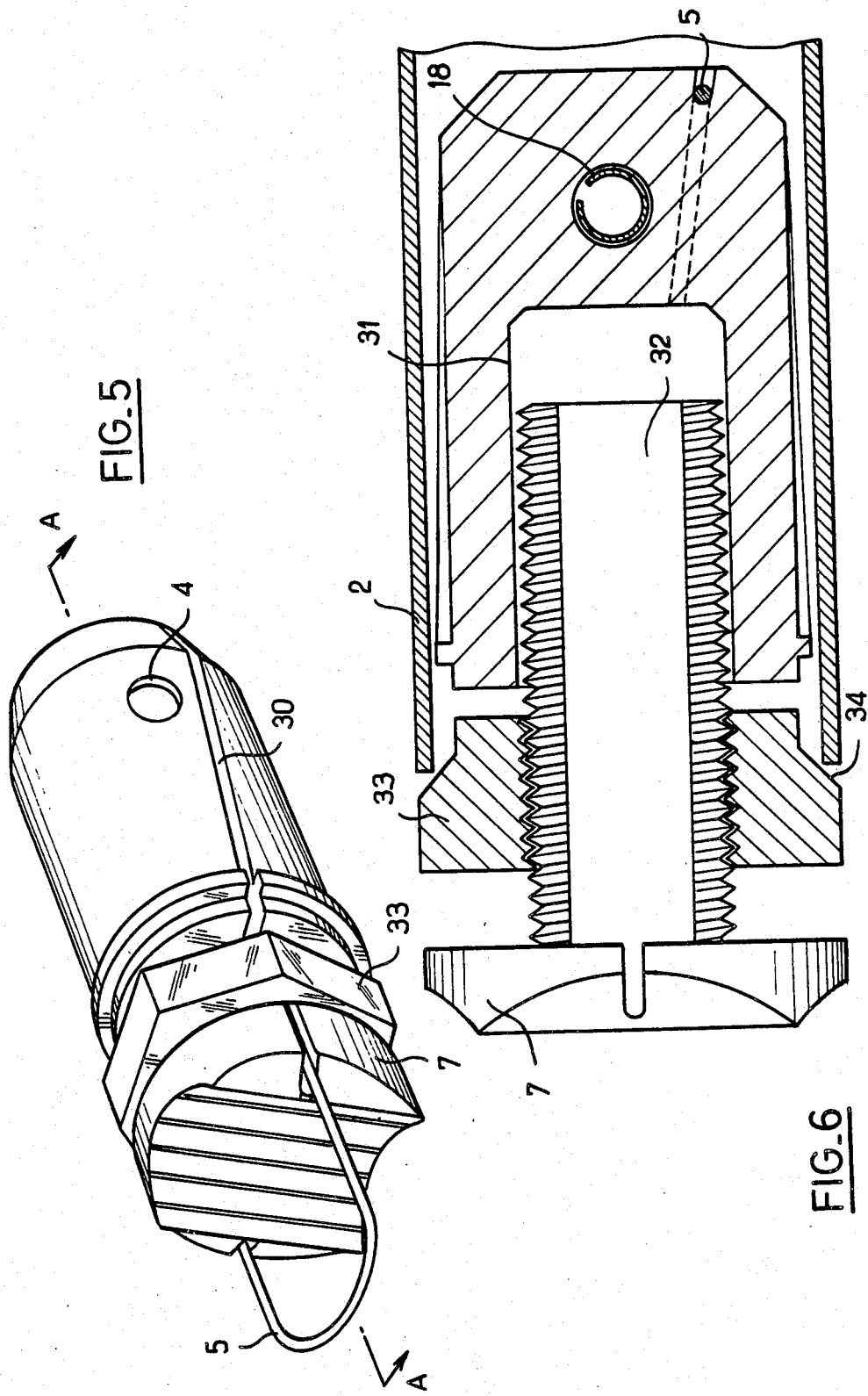

STRUCTURAL FIXING DEVICES FOR FURNITURE

BACKGROUND OF THE INVENTION

For some years, furniture formed from modular elements has been widely used, including furniture formed by uprights (tubes or bars of square, circular or other cross section) assembled together horizontally and vertically, on which are laid shelves, frontages, doors .... These pieces of furniture are very generally sold unassembled in the form of kits and are assembled together by the purchaser. The assembly process and the device for fixing the elements together must then be simple.

As a general rule, the uprights are connected together by means of nodes or jointing pieces which are of two main types: the uprights are fixed by means of a jointing piece in which two or three uprights slide, securing being provided by screwing of a mobile element of the jointing piece. This device has good properties of rigidity of assembly but has the drawback of not being coplanar.

According to another type, assembly takes place by means of elements which fit into the uprights or into which the uprights fit while allowing a coplanar assembly thereof. However, with such systems several tiers of uprights of greater or lesser length cannot be superimposed for they lack rigidity.

Other known devices use jointing pieces to which wood or metal rods are fixed by means of pins.

In most cases, the jointing devices are provided for orientating three uprights in three planes perpendicular to each other but it is generally possible to adapt the jointing pieces to another number of uprights in planes intersecting at angles other than right angles, in particular when it is desired to obtain a frame like structure.

SUMMARY OF THE INVENTION

The present invention provides devices for assembling and fixing hollow structural sections to hollow assembly elements comprising, in combination, an end piece introduced into the end of a hollow structural section, a holding cable surrounding the assembly element and a device for tensioning the cable, movable in a cavity of the end piece.

The devices for tensioning the cable are of two main types, described briefly below:

1. A first type comprises a winding shaft, perpendicular to the longitudinal axis of the end piece on which the holding cable is fixed and which may assume in a cavity of an end piece an active position for winding the cable and a passive position in which the shaft is locked in the cavity after clamping of the holding cable forming a loop of variable length.

2. A second type comprises a device coaxial with the end piece comprising a screw-nut assembly whose movement between a retracted position and a projecting position ensures tensioning of the holding cable which forms a loop of fixed length.

In the first case, the tightening cable is fixed to the winding shaft at least by one of its ends; the other being anchored in the end piece or to the winding shaft. In this latter case, the winding takes place symmetrically and allows better distribution of the tightening tension.

The head of the end piece forms a shoulder which comes into abutment against the end of the hollow section and its outer surface has a configuration allowing it to adjust itself to the assembly element.

The winding shaft comprises a toothed wheel which is locked in a notched circular housing when the winding shaft passes from its active position to its passive position.

In the second case, the tightening cable is fixed at both ends to the end piece. The head of the end piece is extended by a threaded rod movable in a corresponding tapping inside the body of the end piece, so as to provide relative movement of the head and of the body of the end piece.

A nut locks the head against the assembly element.

As in the first case, the outer surface of the head of the end piece has a configuration allowing it to adjust itself to the assembly element.

With such end pieces, hollow sections, in which the end pieces are introduced, can be fixed to assembly elements and generally these assembly elements will also be hollow sections.

The hollow structural sections have a circular, square, rectangular or other cross section. The assembly elements will generally have the same cross section. Thus, in the case of tubular sections, the assembly elements will be either tubular, or spherical, the head of the end piece comprising a concave recess having the same radius of curvature as the structural section. In the case of structural sections with a polygonal cross section, the assembly elements will either be structural sections with a polygonal cross section or polyhedrons, the head of the end piece then being formed by a flat surface coming to bear on the assembly element. It is also possible, using appropriate end pieces, to assemble structural sections on assembly elements having a different cross section, the body of the end piece having a cross section corresponding to that of the hollow structural section and the head having an outer surface matching that of the assembly element.

The end piece is fixed to the hollow structural section by means of a pin or similar element.

Generally, the end piece will be fixed to the structural section in the factory by means of a pin force fitted into corresponding apertures in the end piece and the structural section. The length of the holding cable is such that the assembly element can be fitted into the loop of a cable and the structural section brought to the position on the assembly element where it is desired to fix it. But it is also possible for the end piece to be fitted into the structural section and fixed at the time of assembly.

The invention will now be described in detail, with reference to the use of tubular structural sections, but it is obvious that it is not limited thereto, the modifications to be made being evident.

BRIEF DESCRIPTION OF THE DRAWINGS

FIG. 4 is a sectional view of yet another winding shaft device and FIGS. 4a and 4b are side views of this device, FIG. 5 is a perspective view of a fixing device of the second type, FIG. 6 is a sectional view through AA of FIG. 5 of the device fitted in a hollow structural section for fixing it to an assembly element.

A certain number of elements are common to both types of devices and bear the same reference numerals.

DESCRIPTION OF EMBODIMENTS

The assembly element 1 are generally tubular sections identical to the tubular sections 2 which are fixed to them. These metal tubes having for example an outer diameter of 22 mm and an inner diameter of 20 mm.

Smaller or greater diameters may of course be used, the values indicated above being the optimum values for building sets of shelves, bookshelves . . . . Higher values will be used when the structure will be subjected to higher loads, for example when it will be intended to carry very heavy articles. The tubes may comprise circumferential grooves, evenly spaced apart by 10 cm for example, so as to facilitate fitting of the structural sections but these grooves are not indispensable for use of the fixing device.

Figure 8:
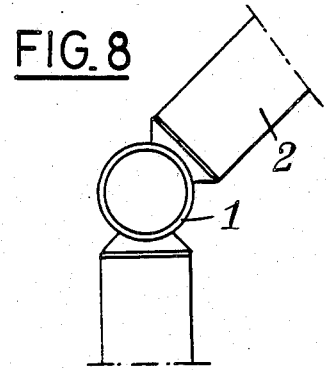

The assembly element 1 may also be a sphere, grooved or not (see FIG. 8). If the structural sections have polygonal cross sections, the assembly element has the form of a polyhedron when it is desired to build structures of the frame like type. The following description is made by using as assembly element 1 a tubular structural section similar to the tubular structural sections 2 which are fixed thereto.

The first type of fixing device will now be described, for which several embodiments have been developed (FIGS. 1 to 4).

The tubular structural section 2 comprises at its end a slot 3 for passing the tightening cable and the winding shaft therethrough. An aperture 4 is formed through the tubular section, beyond the slot for introducing a pin.

The end piece 6 comprises an essentially cylindrical body and a head 7 which forms a shoulder 8 with respect to the body of the end piece. The head ends in a concave recess 9 whose radius of curvature corresponds to that of the assembly element 1, so that the head 7 may be applied against tube 1 during tightening of cable 5. The end piece is formed with a groove whose bottom 10 is oblique with respect to the longitudinal axis of the end piece. This groove ends in a cavity 11 formed in the end piece. In the embodiment shown, cavity 11 comprises three parts, the first cylindrical with a smooth wall, the second cylindrical and serrated, the third cylindrical with a smooth wall ending in a truncated cone section, the diameter decreasing gradually from the first to the third part. The end piece also comprises an aperture 13 for introducing a pin.

The end piece is made from a plastic material, for example acetal resin, and one end of the tightening cable 5 is embedded over a certain length in end piece 6.

The winding shaft 14 is formed from a first cylindrical part to which the second end of cable 5 is fixed and which comprises an aperture 15 for possibly introducing a wrench or a tightening or untightening tool. The diameter of this first cylindrical part is very slightly less than the width of slot 3 of the tubular element 2 for providing the passage and clearance of the shaft in the slot.

A toothed wheel 16 integral with the winding shaft or firmly secured thereto has an outer diameter greater than that of slot 3 and prevents the shaft from completely coming out thereof when it moves perpendicularly to the axis of the slot. A second cylindrical part extends the shaft beyond the toothed wheel. In the embodiment shown, this second cylindrical part has a diameter less than that of the winding shaft and has one truncated cone shaped end but these two characteristics are not indispensable. Similarly, one of the faces of the toothed wheels (on left hand in FIG. 1) may join up with the second cylindrical part of the shaft extending the wheel through a truncated cone shaped section.

Cavity 11 formed in the end piece has a configuration and dimensions such that it is possible to fit therein the second cylindrical part of the winding shaft and its toothed wheel, the teeth of the wheel fitting into the notched or serrated part 12 of cavity 11.

End piece 6 is generally fixed in the hollow structural section in the factory. The end piece is fitted in tube 2 after the winding shaft has been partially fitted into cavity 11 so that the toothed wheel is inside tube 2, the first cylindrical part of the shaft sliding in slot 3. The end piece is secured to tube 2 by means of a pin (not shown) force fitted into apertures 4 and 13.

The cable then forms a loose loop at the end of the hollow section. The assembly element 1 is fitted into one or more cable loops depending on the number of structural sections which it is desired to fix to the same assembly element. The structural section is brought to the desired position, the end piece is applied against the assembly element and the cable is wound on the winding shaft by rotating this latter (in a clockwise direction for the case shown in the Figures), the shaft being held in the active position shown in FIG. 2 during this operation. When the tightening is sufficient, the winding shaft is pushed into cavity 11 so as to lock the toothed wheel 16 in the serrated housing 12, the cable then resting on the bottom 10 of the groove. The number of teeth of wheel 16 is calculated so that the clearance required for fitting the teeth into the corresponding hollows of housing 16 does not appreciably modify the desired degree of tightening of the cable.

If a device is used for fixing which is more readily removable than a force fitted pin, the end piece may be fitted into the structural section at the time of assembly and the section fixed to the assembly element. The end piece is then secured to the hollow section after the cable has been wound and the toothed wheel locked in the serrated housing.

Other tubes 2 may then be fixed to element 1 at the same position or at different positions. Tube 2 may itself serve as assembly element 1 and thus a tubular structure may be constructed step by step on which may be fixed or laid shelves, edges, bottoms, doors and other elements.

The outer cylindrical part of the winding shaft 14 has in the embodiment shown a length such that the winding shaft may be rotated manually. Aperture 15 is provided for fitting a wrench or a tool for pulling the shaft so as to disengage it from its passive position. In the case shown in FIG. 2, with element 1 being horizontal and tube 2 vertical, the part of the winding shaft 14 which is outside tube 2 may serve as a support for a shelf for example.

The length of the winding shaft may also be such that its end is flush with tube 2 when it is in its locked position. In this case, no aperture 15 is provided for and the flat end of the winding shaft comprises a slot for operating it for winding the cable or locking and unlocking the shaft by means of an appropriate tool.

Figure 1:
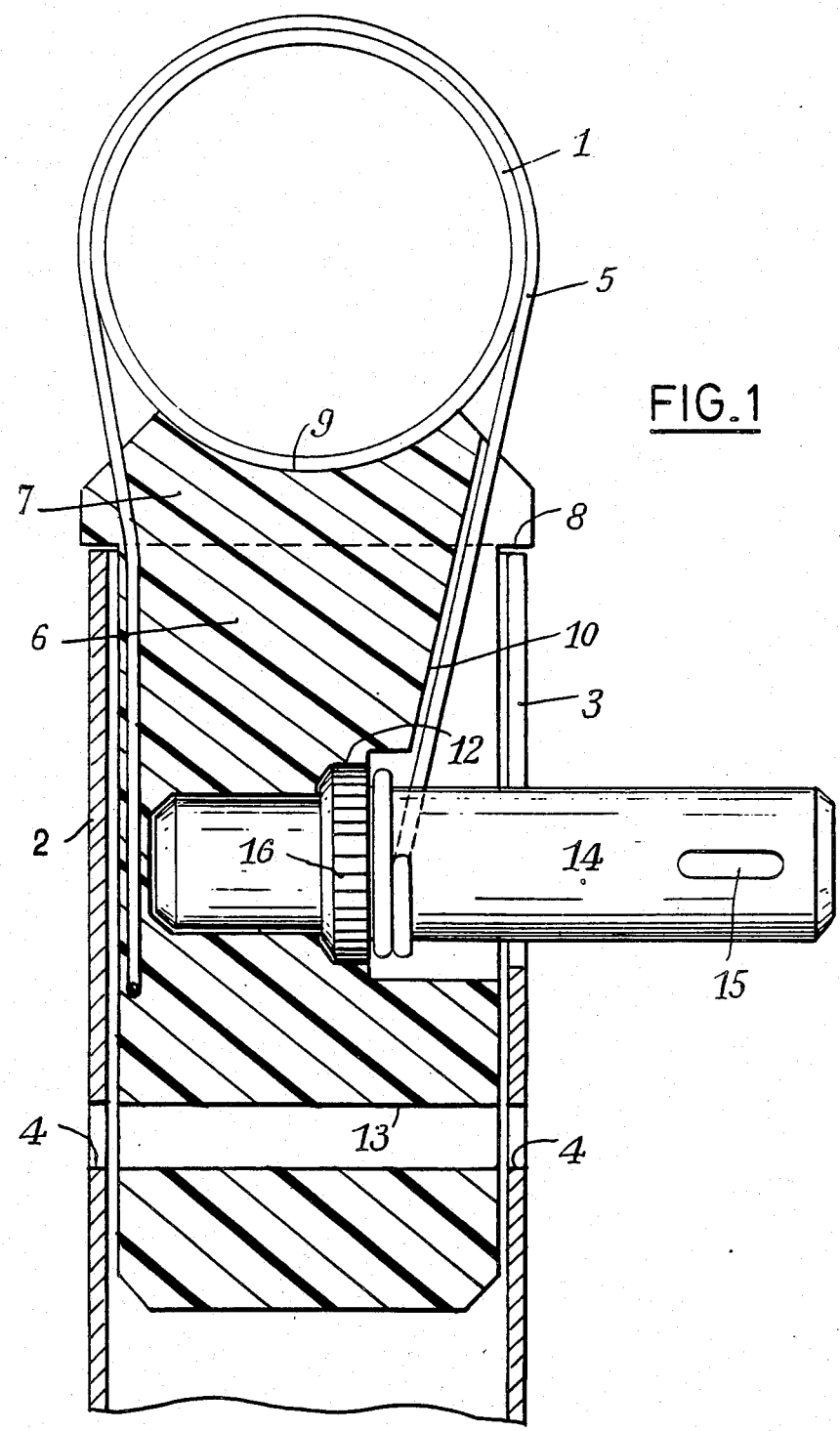
FIG. 1 is a sectional view of a device according to the present invention, the winding shaft being in the locked position.
Figure 2:
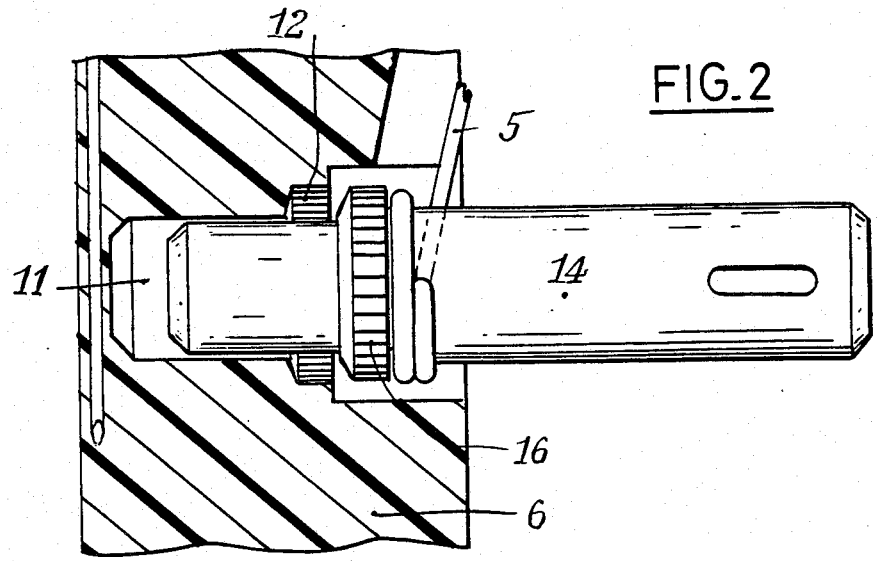
FIG. 2 is a partial view of the end piece and of the winding shaft, in the winding position.

In FIGS. 1 and 2, cable 5 is shown embedded over a certain distance in the end piece 6. Other well known anchoring processes are also possible, stapling for example.

Figure 7:
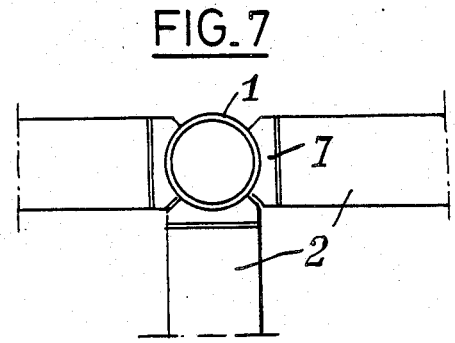
FIGS. 7 and 8 show two possibilities of fixing tubular sections to the same assembly element.

The head 7 of the end piece 6 is shown with a straight part and a tapered part which allows or facilitates the arrangement of several tubular elements 2 on the same assembly element 1 (FIG. 7) but modifications of the shape and of the dimensions of the head are obviously possible.

Figure 9:
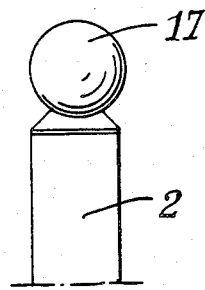
FIG. 9 shows the fixing of a tubular structural section to another type of assembly element.

In the case where the assembly element 1 is a sphere 17 (FIG. 9), the recess 9 in the head of the end piece has the shape of a spherical skull cap and not that of part of a cylinder.

This fixing device provides a good strength for the tubular element assembly even with an assembly of great length or height having several horizontal levels and vertical subdivisions.

Figure 3:
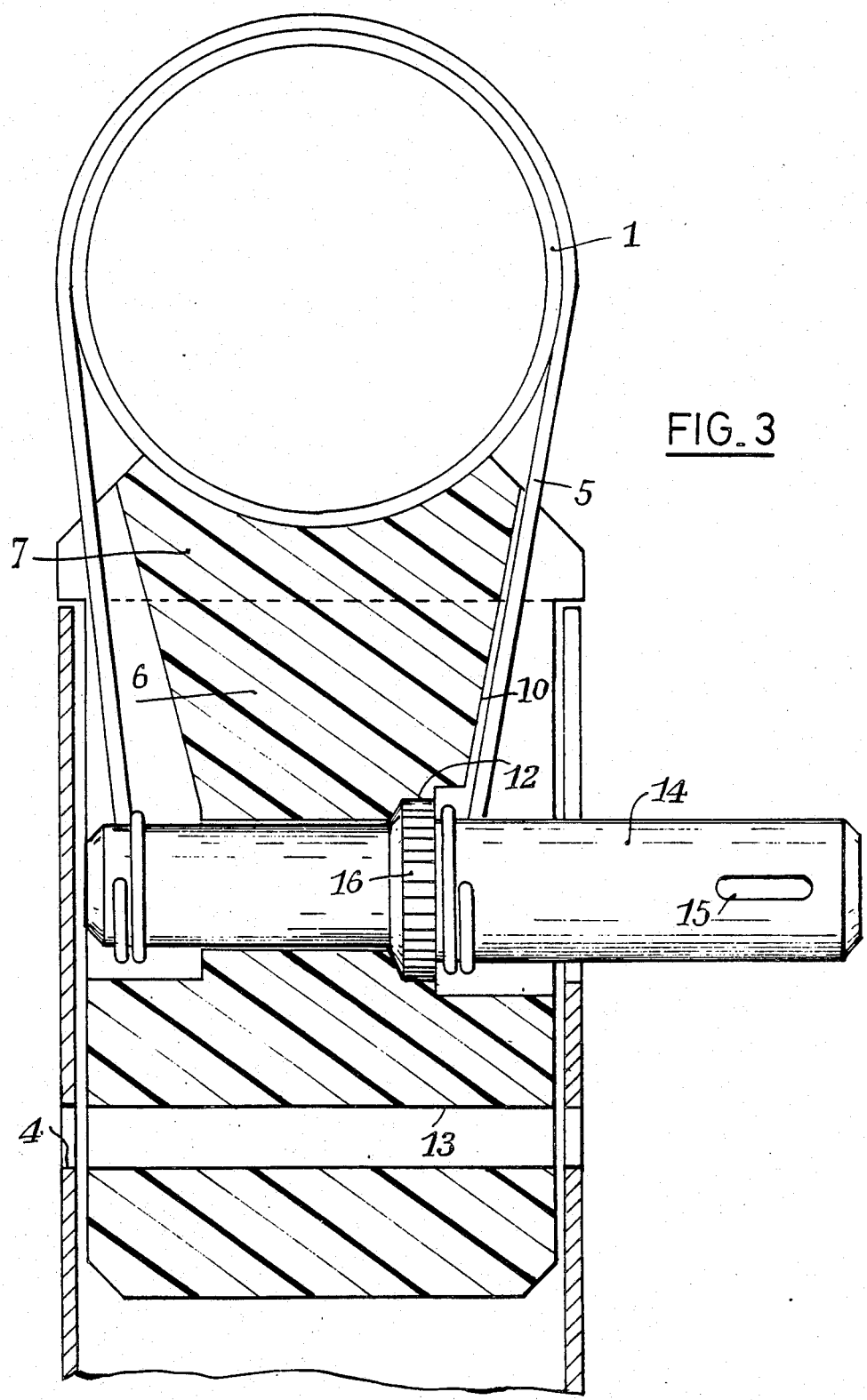
FIG. 3 is a sectional view of another device in accordance with the invention, the winding shaft being in the locked position, the tightening cable being fixed at both its ends to the winding shaft.

FIG. 3 shows an embodiment of the end piece and of the winding shaft of the present invention.

In this case the two ends of the tightening cable are fixed to the winding shaft and the end piece comprises two diametrically opposite grooves, cavity 11 passing through the end piece from one side to the other for passing the winding shaft therethrough whose end comes flush with the surface of the end piece when it is in the locked position. With the two ends of the tightening cable thus fixed to the winding shaft, symmetrical winding of the cable is obtained as well as a better distribution of the tightening tension. This double winding mechanism involves the use of a winding shaft whose second cylindrical part has a greater length and is more suited to tubular structural sections of larger diameter, for example having an outer diameter of 25 mm or more.

The two cylindrical parts of the winding shaft have then the same diameter, which is not necessarily so in the case where a single end of the cable is fixed to the winding shaft.

Figure 4:
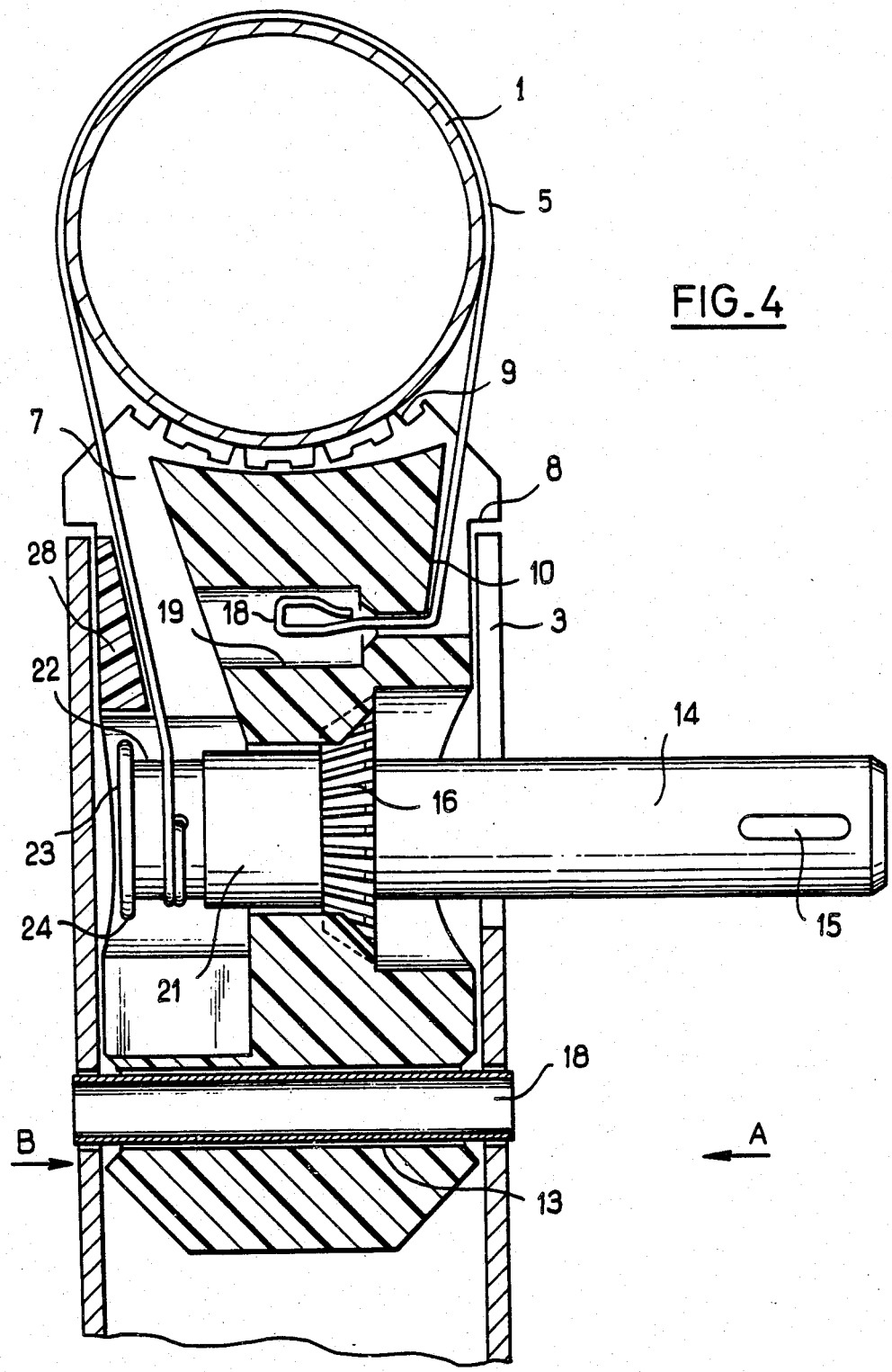

FIG. 4 shows a section of another embodiment in which one of the ends of the cable is fixed in the end piece and the other is fixed to the winding shaft, but to its second cylindrical part.

The end 18 of the cable forms a staple inserted in a hole 19 passing through the body of the end piece and comprising a constricted orifice 20 preventing the end of the cable from leaving hole 19.

The other end of the cable is fixed to the second cylindrical part of the winding shaft, whose end has been slightly modified with respect to the variants shown in FIGS. 1 and 3. Instead of being terminated by a truncated cone shaped section, the second cylindrical part 21 comprises a section 22 of slightly smaller diameter on which the cable is wound and ends in an endmost part 23 of a diameter greater than that of section 22 but less than or equal to that of part 21, forming a flange 24 preventing the cable from sliding out of the cylindrical part 21.

FIGS. 4a and 4b show a side view (along arrow A of FIG. 4) and a side view (along arrow B of FIG. 4) of the end piece (the cable and the winding shaft not being shown). In FIG. 4a, the body 6 and the head 7 forming a shoulder 8 can be seen. Cavity 11 formed in the body of the end piece comprises a serrated part 12 in which the toothed wheel of the winding shaft is locked. Beyond the serrated part, cavity 11 passes through the body of the end piece while forming a hole 25 in which the winding shaft 12 will move. This hole opens into a triangular shaped cavity 11' terminated by a circular end. The circular part with flat bottom corresponds to cavity 11 and the triangular part with oblique bottom guides the cable and causes it to penetrate into the groove 26 formed laterally in head 7. Two ribs 27 projecting inwardly of the triangular part retain a triangular wedge 28 (FIG. 4) comprising two corresponding recesses, which is placed in the triangular part once the cable is positioned for holding it inside the end piece. Opposite the triangular part, cavity 11' is extended by a groove 29. The shape of cavity 11' may be modified, but is must allow the end 18 of the cable to be fitted into its fixing hole 19 and the other end of the cable to be guided and fixed to part 21 of the winding shaft.

It will be noted that the head comprises a lateral groove 26a, diametrically opposite to groove 26, in which the tensioned cable is engaged.

Recess 9 of the end piece head shown in FIG. 4 is modified with respect to those of FIGS. 1 and 2 in that it comprises grooves or ribs parallel to the axis of the assembly element 1. The purpose of these grooves or ribs is to increase the friction and to improve the connection between the assembly element 1 and the structural section 3 via the end piece 6.

A fixing device of the second type, shown in FIGS. 5 and 6, will now be described.

In such an end piece, cable 5 forms a closed loop of fixed length and is fitted in diametrically opposite grooves 13 formed over the whole length of the body of the end piece.

The end piece is formed from a cylindrical body whose end penetrating into the hollow structural section 2 may have a truncated cone shape. The head 7 of the end piece is mounted on a threaded rod 32 penetrating into a tapped portion 31 of corresponding size formed in the end piece. A nut 33, having an external hexagonal shape for example, is situated between the head and the body of the end piece; the part of the nut situated on the end piece body side forms a shoulder 34 coming into abutment against the hollow structural section.

In this embodiment of the fixing device, the loop of the cable is not tightened about the assembly element, but the head of the end piece is caused to extend from its body by unscrewing rod 32 and is locked in the desired position against the assembly element by means of the nut. The head comprises, as in the other devices, a recess having a shape corresponding to that of the assembly element, preferably with grooves or ribs similar to those described for recess 9 of the device shown in FIG. 4.

Modifications of this device will be obvious for the man skilled in the art.

Of course, in all cases and as previously mentioned, it is possible to use hollow structural sections having a polygonal cross section by appropriately modifying the cross section of the assembly element and the head of the end piece. These modifications will be obvious to a man skilled in the art and should be considered as forming part of the scope of the invention.

What is claimed is:

1. A device for fixing hollow structural sections to assembly elements, comprising, in combination, an end piece fitted into the end of a hollow section, a holding cable surrounding an assembly element and a device for tensioning said cable, said tensioning device being a winding shaft to which is fixed at least one end of said cable and which may move in a cavity between an active position for winding said cable and a passive position in which said shaft is locked in said cavity, said winding shaft comprising a toothed wheel which, when the winding shaft is in the locked position, is locked in a circular serrated housing in the cavity of the end piece.

2. The device according to claim 1, wherein the hollow structural section comprises a slot whose width is slightly greater than the diameter of the winding shaft and less than the outer diameter of the toothed wheel.

3. The device according to claim 1, wherein one end of said tightening cable is anchored in said end piece.

4. The device according to claim 1, wherein both ends of said tightening cable are fixed to said winding shaft.

5. The device according to claim 1, wherein said end piece is fixed to said hollow structural section by means of a pin force fitted in an aperture of the structural section and an aperture in the end piece.

6. The device according to claim 1, wherein the part of the end piece situated outside the hollow structural section comprises a shoulder resting on the end of the hollow structural section.

7. The device according to claim 1, wherein the assembly element has a circular cross section and the head of the end piece comprises a concave recess having the same radius of curvature as the assembly element.

8. The device according to claim 1, wherein the assembly element has a polygonal cross section and the outer surface of the end piece is flat.

9. A device for fixing hollow structural sections to assembly elements comprising, in combination, an end piece fitted into the end of a hollow section, a holding cable surrounding an assembly element and a device for tensioning said cable, said tensioning device being formed from a threaded rod carrying the head of the end piece, moving in a tapped portion formed in the body of the end piece and a nut locking the rod and the end piece in the desired relative position.

* * * * *